United States Patent [19]
von Düsterlho

[11] Patent Number: 4,924,925
[45] Date of Patent: May 15, 1990

[54] HORIZONTAL LINK MEMBER FOR CONNECTING VERTICAL LINKS OF A TIRE CHAIN

[75] Inventor: Wolfgang von Düsterlho, Herschweiler-Pettersheim, Fed. Rep. of Germany

[73] Assignee: Icis-Tirestar Vertrieb Montage Service W. von Düsterlho KG, Herschweiler-Pettersheim, Fed. Rep. of Germany

[21] Appl. No.: 222,213

[22] Filed: Jul. 21, 1988

[30] Foreign Application Priority Data

Jul. 24, 1987 [DE] Fed. Rep. of Germany ....... 3724538

[51] Int. Cl.$^5$ ..................... B60C 27/20; A44B 13/00
[52] U.S. Cl. ............................. 152/243; 152/239; 59/84; 24/241 SL; 24/231
[58] Field of Search ................... 152/213 R, 233, 171, 152/172, 239, 241, 242, 243, 244, 184, 231; 59/78, 84, 93; 24/230.5 R, 231, 458, 483, 241 PS, 241 SL, 238

[56] References Cited

U.S. PATENT DOCUMENTS 3,783,923  1/1974  Dohmeier ..................... 152/243
4,544,010 10/1985  Friedewald ................... 152/244

Primary Examiner—Michael W. Ball
Assistant Examiner—Gregory J. Wilber
Attorney, Agent, or Firm—Robert W. Becker & Associates

[57] ABSTRACT

A horizontal link member for connecting vertical links of a tire chain. The link member includes a ring element and a closure part. The ring element includes a ring body that merges via transition portions into two outwardly extending arms that are adapted to contact one another in a closed position of the link member. The closure part is adapted to be placed over the arms to bring about the closed position of the link member and contact of the arms with one another. The closure part is provided with deformable holding portions, in the form of indentations of wall portions of the closure part, for effecting securement of the closure part to the ring element. The indentations extend transverse to a plane connecting longitudinal central axes of the arms, and are adapted to extend into recessed portions of the arms to effect the securement of the closure part to the ring element.

9 Claims, 3 Drawing Sheets

HORIZONTAL LINK MEMBER FOR CONNECTING VERTICAL LINKS OF A TIRE CHAIN

BACKGROUND OF THE INVENTION

The present invention relates to a horizontal link member for connecting vertical links of a tire chain, especially an anti-skid chain. The horizontal link member has a ring element that includes outwardly extending arms that adjoin a ring body via transition portions. When a closure part is placed upon the arms, the latter contact one another. The closure part is secured on the ring element via deformable holding portions.

With a heretofore known horizontal link member of the aforementioned general type (German Patent No. 32 34 028 Friedewald dated Jul. 10, 1986 corresponding to U.S. Pat. No. 4,544,010-Friedewald dated Oct. 1, 1985), the closure part is provided with an elliptical main body, on each of the two long sides of which is provided a respective holding tongue that, for positive connection to the ring element, is bent inwardly into the opening of the ring body of the ring element. Due to the holding tongues, this heretofore known closure part has a relatively complicated construction. In addition, a relatively great amount of material is required in order to manufacture these holding tongues, thereby considerably increasing the manufacturing costs of the closure part and hence of the horizontal link member. Since the holding tongues extend into the ring opening, this heretofore known link member has the further drawback that it can adversely affect the mobility of the vertical links that are placed in the ring element.

It is therefore an object of the present invention to provide a horizontal link member of the aforementioned general type that is embodied in such a way that the closure part, despite a reliable, positive connection with the ring element, can be manufactured in a straightforward and economical manner while at the same time preventing obstruction of the mobility of the vertical links in the ring element due to holding portions of the closure part.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The horizontal link member of the present invention comprises: a ring element that includes a ring body that merges via respective transition portions into two outwardly extending arms that are adapted to contact one another in a closed position of the horizontal link member, with the arms being provided with recessed portion means; and a closure part that is adapted to be placed over the arms to bring about the closed position of the horizontal link member and contact of the arms with one another; the closure part is provided with deformable holding portions for effecting securement of the closure part to the ring element, with the holding portions being formed by indentation means of respective wall portions of the closure part, and with the holding portions extending transverse to a plane connecting longitudinal central axes of the arms, and being adapted to extend into the recessed portion means of the arms to effect the securement of the closure part to the ring element.

As a consequence of the inventive construction, the positive connection between the closure part and the arms is provided in the region beyond the opening of the ring element, so that the vertical links are not prevented from moving back and forth within the ring element by the holding portions. A further advantage of the inventive construction is that the closure part is embodied as a simple sleeve part, so that no additional holding tongues or the like are required. Instead, the inventive closure part is secured to the ring element exclusively by plastic deformation of wall portions of the closure part. To accomplish this, after the closure part has been placed upon the arms, it is merely necessary to press the appropriate wall portions of the closure part inwardly into the adjacent recessed portions of the arms with the aid of a tool. This actually forms the holding portions or indentations, which extend in a positively connecting manner into the recessed portions. As a result, an extremely secure connection of the closure part to the ring element can be achieved, while at the same time the closure part can be manufactured in an economical and straightforward manner.

Further specific features of the present invention will be described in detail subsequently.

DESCRIPTION OF PREFERRED EMBODIMENTS

Figure 1:
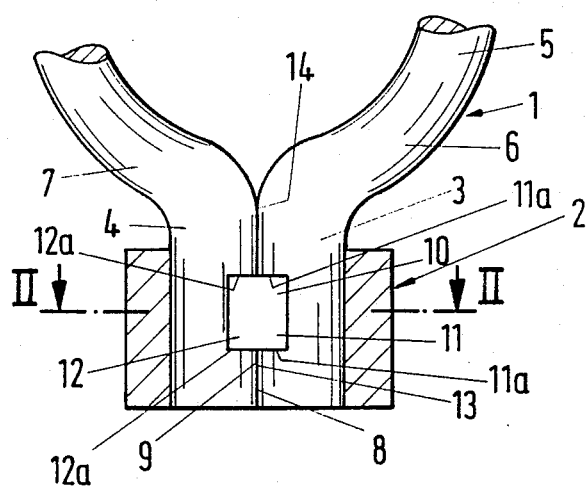
FIG. 1 is a partial plan view and partial cross-sectional view of a portion of one exemplary embodiment of the inventive horizontal link member.
Figure 2:
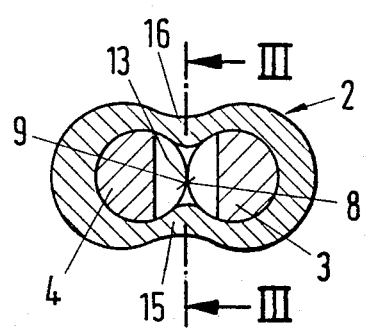
FIG. 2 is a cross-sectional view taken along the line II—II in FIG. 1.
Figure 3:
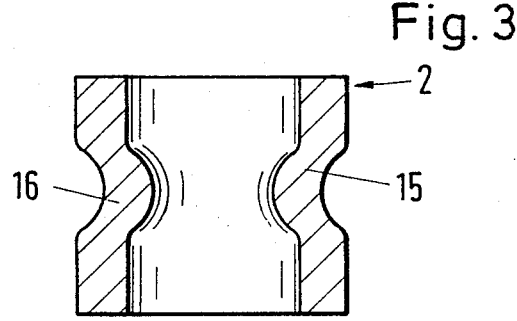
FIG. 3 is a cross-sectional view taken along the line III—III in FIG. 2, and shows a closure part of the horizontal link member of FIGS. 1 and 2.

Referring now to the drawings in detail, the horizontal link member of FIGS. 1 to 3 comprises a ring element 1 and a sleeve-like closure part 2 that is secured upon outwardly extending arms 3, 4 of the ring element. The ring element 1 has a ring body 5 that merges into the arms 3, 4 via transition portions 6, 7 that are curved outwardly in the form of a partial circle. Before the closure part 2 is mounted on the ring element 1, the arms 3, 4 are spaced from one another and delimit a non-illustrated introduction opening for non-illustrated vertical links of a tire chain, which vertical links are to be placed in the ring element 1. After the vertical links are placed in the ring element 1, the arms 3, 4, by elastic deformation of the ring element, are pressed together into the position illustrated in FIG. 1; in this position, the inner surfaces 8, 9 of the arms 3, 4 rest against one another. Since the arms 3, 4 have round, and preferably circular, cross-sectional areas, the arms, at 13, 14, make linear contact with one another. To secure the position of the closure part 2 on the arms 3, 4, the abutting arms form a recessed portion 10 that in turn is formed by a cut-through. In particular, as can be seen in the side view of FIG. 1, the recessed portion 10 is formed by two U-shaped recesses 11, 12 of the two arms 3, 4. As can be seen from FIG. 1, the recesses 11, 12 are open in a direction facing one another, with the side walls 11a and 12a being aligned when the arms 3, 4 rest against one another. In the illustrated embodiment, the recessed portion 10 has a rectangular or square shape. In the axial direction of the arms 3, 4, the recesses 11, 12 extend over approximately one third of the length of the arms, and are disposed approximately in the central portion of the arms. The depth of the recesses 11, 12 is less than the radius of the arms; the width of the recesses 11, 12 is preferably approximately one third of the diameter of the arms 3, 4. The inner surfaces 8, 9 of the arms 3, 4 abut one another at the contact locations 13, 14 in the region axially adjacent to the recessed portion 10.

To secure the position of the closure part 2 upon the arms 3, 4 after the arms have been bent together, the closure part 2 is inserted over the abutting arms until it assumes the position illustrated in FIG. 1. Thereupon, the closure part 2 is plastically deformed with a tool, such as pliers or the like, in such a way that at the level of the recessed portion 10, the wall regions of the closure part 2 extend inwardly into this recessed portion. The plastically deformed wall regions of the closure part 2 form indentations 15, 16 (FIGS. 2 and 3) that form positive-connection elements on the closure part 2.

As a result of this positive connection, the closure part 2 is satisfactorily protected from twisting and shifting on the arms 3, 4. To establish the positive connection, it is merely necessary to provide the recesses 11, 12 in the arms 3, 4, and to plastically deform the closure part 2 in the region of the recessed portion 10 in the manner described. Since the closure part 2 is embodied as a sleeve, the horizontal link member can be manufactured in a structurally straightforward and economical manner, and the closure part can be easily and rapidly mounted.

Figure 4:
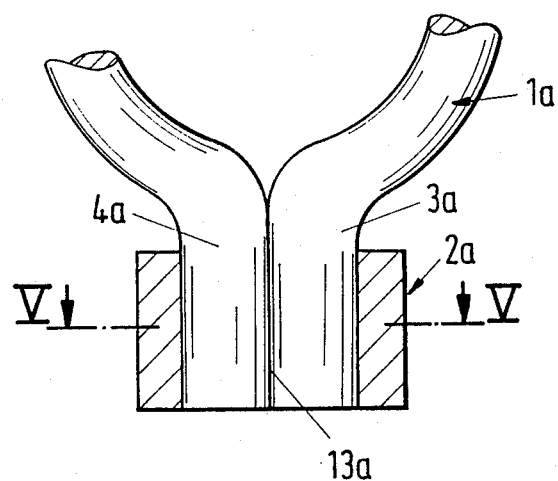
FIG. 4 is a partial plan view and partial cross-sectional view of a portion of a second exemplary embodiment of the inventive horizontal link member.
Figure 5:
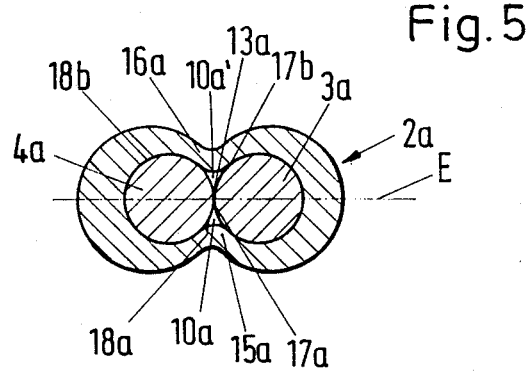
FIG. 5 is a cross-sectional view taken along the line V—V in FIG. 4.

The embodiment illustrated in FIGS. 4 and 5 differs from the previously described embodiment in that the arms 3a, 4a have the same circular cross-sectional shape over their entire length, in other words, these arms have no recesses. The sleeve-like closure part 2a has an embodiment similar to the closure part 2 of the embodiment of FIGS. 1 to 3. The closure part 2a is secured to the arms 3a, 4a by plastically deforming the wall regions of the closure part 2a. Since the arms 3a, 4a that rest against one another via a linear contact have a circular cross-sectional area, recessed portions 10a, 10a' are formed on opposite sides of the arms 3a, 4a; these recessed portions 10a, 10a' extend over the entire length of the arms (FIG. 5).

The recessed portions 10a and 10a' are separated from one another by the contact line 13a of the arms 3a, 4a, and are delimited by peripheral portions 17a, 18a and 17b, 18b of the arms 3a, 4a that adjoin the contact line 13a. The adjacent wall regions 15a, 16a of the closure part 2a are pressed into these recessed portions 10a, 10a'. As described in connection with the previous embodiment, via the partial plastic deformation, the closure part 2a is pulled tightly against the arms 3a, 4a, so that the closure part 2a rests firmly against the arms over a large portion of its periphery. In contrast to the previous embodiment, the closure part 2a is not positively secured in the longitudinal direction of the arms 3a, 4a, but rather rests frictionally against the arms. The strength of the frictional connection can be set very easily by the degree of deformation of the wall regions 15a, 16a of the closure part 2a. The greater the wall regions 15a, 16a of the closure part 2a are plastically deformed, the greater is the closure part 2a pressed against the arms 3a, 4a. In any case, the frictional connection is great enough that even when the horizontal link member encounters great tensile load, the closure part 2a cannot be pulled from the arms 3a, 4a.

The horizontal link member of FIGS. 4 and 5 has a structurally straightforward embodiment since the ring element can be manufactured from a wire having a constant cross-sectional shape. A subsequent machining of the ring element 1a is not required. The closure part 2a is formed from a simple sleeve.

Figure 8:
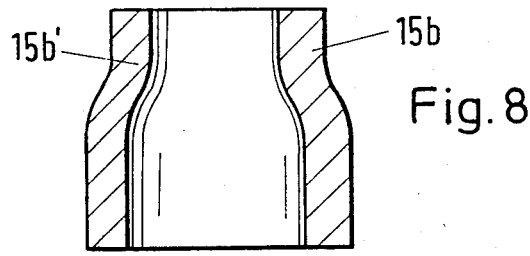
FIG. 8 is an axial cross-sectional view, in a plastically deformed state, of a closure part of the horizontal link member of FIGS. 6 and 7.
Figure 6:
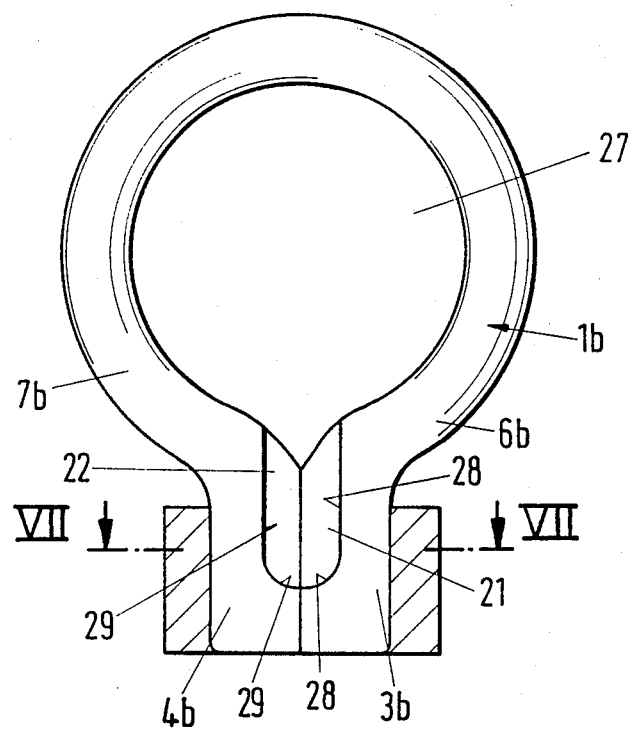
FIG. 6 is a partial plan view and partial cross-sectional view of a third exemplary embodiment of the inventive horizontal link member.
Figure 7:
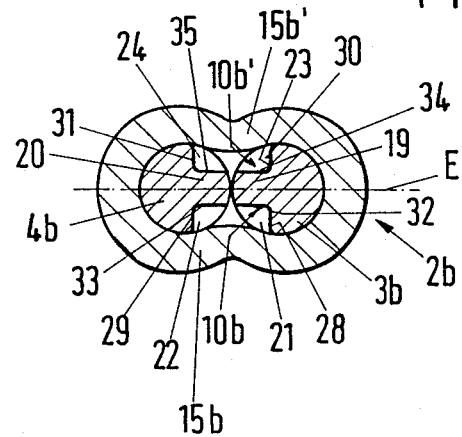
FIG. 7 is a cross-sectional view taken along the line VII—VII in FIG. 6.

In the embodiment illustrated in FIGS. 6 to 8, the abutting arms 3b, 4b have two recessed portions 10b and 10b' that are each formed by two facing recesses 21 to 24 of the arms 3b, 4b. The two recesses 21, 23 and 22, 24 of each arm 3b and 4b are separated from one another by ribs 19, 20. The thickness of the ribs 19, 20 is less than the maximum width of the recesses 21 to 24 as measured transverse to the connecting plane E of the arms 3b, 4b. The end faces of the ribs 19, 20 are rounded in conformity to the cross-section radius of the arms 3b, 4b, so that the arms rest linearly against one another over their entire height. The recesses 21 to 24 and the ribs 19, 20 extend from the opening 27 of the ring element 1b, i.e. from the transition portions 6b, 7b thereof, over approximately three fourths of the length of the arms 3b, 4b and end at a distance from the free ends of the arms. As shown in FIGS. 6 and 7, the recesses 21 to 24 are delimited at right angles to the connecting plane E by planar bases 28 to 31 that at their ends that face the end faces of the arms extend in the manner of a partial circle in the direction toward the respective opposite arm. When, as illustrated in FIG. 6, the arms rest against one another, the bases 28 to 31 abut one another via their curved ends, so that the recessed portions 10b and 10b' that are formed by the recesses 21, 22 and 23, 24 are rounded in the manner of a partial circle and have bases that delimit them in the direction toward the end faces of the arms 3b, 4b. The recessed portions 10b, 10' are open in the direction toward the opening 27 of the ring element 1b. Over their entire length, the bases 28 to 31 adjoin the side faces 32 to 35 of the ribs 19, 20 at right angles.

In the starting position, as with the previous embodiments, the arms 3b, 4b are spaced from one another, so that the vertical links can be placed in the ring element 1b. The arms 3b, 4b are then elastically pressed together into the position illustrated in FIG. 7, and the closure part 2b is placed over the arms. Subsequently, the closure part is plastically deformed, accompanied by the formation of the holding portions 15b, 15b', in such a way that, in a manner similar to that described in connection with the previous embodiments, a positive connection is obtained between the closure part and the ring element.

For this purpose, the closure part, after it is placed upon the arms, is pressed together at those wall sections that are disposed opposite the recessed portions 10b, 10b' to form the indentations 15b, 15b' via which the closure part 2b projects into the recessed portions 10b, 10b'. These indentations 15b, 15b' form the holding portions via which the closure part 2b is protected from being pulled off of the arms 3b, 4b. The ends of the bases 28 to 31, which ends are curved in the manner of a partial circle, form axially effective securing elements for the holding portions 15b, 15b' of the closure part 2b. The closure part is again embodied as a straightforward sleeve member that has no additional holding portions or the like, and can therefore be manufactured in a straightforward and economical manner.

The present invention is, of course, in no way restricted to the specific disclosure of the specification and drawings, but also encompasses any modifications within the scope of the appended claims.

What I claim is:

1. A horizontal link member for connecting vertical links of a tire chain employed as a tire anti-skid chain, with said horizontal link member in combination comprising:

a ring element as the horizontal link member including a ring body that, via respective transition portions joined to the ring body of said ring element, merges into two outwardly extending arms that contact one another in a closed position of said horizontal link member, with said arms centrally along inner sides thereof being provided with intermediate notches as radially recessed indentations disposed in a central portion of said arms, said recessed indentations of said arms being formed by a cut-through in said arms and forming a recess that is open in a direction toward the other of said arms; and an annular closure part that is placed over said arms of said ring element to bring about said closed position of said horizontal link member and said contact of said arms in tight engagement with one another free of any play that would produce looseness and noise during employment of the tire chain; said annular closure part being deformed and crimped into said indentations via respective wall portions of said closure part, for effecting securement of said closure part directly complementary to said ring element forming holding portions extending transverse to a plane that contains longitudinal central axes of said arms therein, and with said holding portions extending directly into said recessed indentations of said arms to effect said securement of said closure part to said ring element with a short axial length for savings of material by elimination of any projecting tongue although retaining securement function plus avoiding noise problems completely due to elimination of play via any misaligned loose fit of parts.

2. A link member in combination according to claim 1, in which, in said closed position, said recessed indentations along inner sides of said arms define a contact line between said arms, and adjoining rounded-off peripheral portions of said arms.

3. A link member in combination according to claim 1, in which said arms have inwardly directed sides that face one another and that are each provided with a respective longitudinally extending rib, with said ribs abutting one another in said closed position of said horizontal link member; disposed in each arm on each side of each rib is a respective recess, with each two adjacent recesses forming a respective one of said recessed indentations for said holding portions of said closure part.

4. A link member in combination according to claim 1, in which said recessed indentations extend in the longitudinal direction of said arms.

5. A link member in combination according to claim 1, in which said recessed indentations have a length that is equal to at least approximately one third of the length of said arms.

6. A link member in combination according to claim 5, in which said recessed indentations have a length that is greater than half of the length of said arms.

7. A link member in combination according to claim 1, in which said arms have an essentially round cross-sectional shape, and said recessed indentations have a depth, measured transverse to said plane that connects said longitudinal axes of said arms, that is equal to at least approximately one third of a diameter of said arms.

8. A link member in combination according to claim 1, in which said arms have inwardly directed sides that face one another and that are each provided with a respective longitudinally extending rib, with said ribs abutting one another in said closed position of said horizontal link member; disposed in each arm on each side of each rib is a respective recess, with each two adjacent recesses forming a respective one of said recessed indentations for said holding portions of said closure part; said depth of said recessed indentations being greater than a thickness of said ribs.

9. A link member in combination according to claim 8, in which said depth of said recessed indentations is approximately twice as great as said thickness of said ribs.

* * * * *